United States Patent [19]

Kudo et al.

[11] Patent Number: 5,093,211
[45] Date of Patent: Mar. 3, 1992

[54] MAGNETIC RECORDING MEDIUM COMPRISING A SURFACE TREATMENT LAYER PROVIDED ON THE MAGNETIC LAYER OF SPECIFIED FLUOROCARBOXYLIC ACID AMINE SALTS

[75] Inventors: Takanori Kudo, Hachioji; Heigo Ishihara, Nishitama, both of Japan

[73] Assignee: Hitachi, Ltd., Tokyo, Japan

[21] Appl. No.: 378,128

[22] Filed: Jul. 11, 1989

[30] Foreign Application Priority Data

Jul. 14, 1988 [JP] Japan .................. 63-173935

[51] Int. Cl.$^5$ .......................................... G11B 23/00
[52] U.S. Cl. .............................. 428/694; 428/695; 428/64; 428/65; 428/421; 428/696
[58] Field of Search ................. 428/694, 900, 695

[56] References Cited
U.S. PATENT DOCUMENTS 4,268,556 5/1981 Pedrotty ..................... 428/65
4,613,520 9/1986 Dasgupta ..................... 427/128
4,794,035 12/1988 Ishihara et al. .............. 428/219

FOREIGN PATENT DOCUMENTS 57-164430 10/1982 Japan .

Primary Examiner—Merrell C. Cashion, Jr.
Assistant Examiner—Stevan A. Resan
Attorney, Agent, or Firm—Fay, Sharpe, Beall, Fagan, Minnich & McKee

[57] ABSTRACT

Disclosed herein are a magnetic recording medium comprising a surface treatment layer provided on the surface of a magnetic coating film by use of a novel surface treatment agent capable of bonding to both magnetic particles and a binder in the magnetic coating film, and a process for producing the magnetic recording medium.

It is possible to realize, with good productivity, a magnetic recording medium having excellent wear resistance and high reliability.

6 Claims, 1 Drawing Sheet

MAGNETIC RECORDING MEDIUM COMPRISING A SURFACE TREATMENT LAYER PROVIDED ON THE MAGNETIC LAYER OF SPECIFIED FLUOROCARBOXYLIC ACID AMINE SALTS

BACKGROUND OF THE INVENTION

This invention relates to magnetic recording media such as magnetic disk, magnetic tape, magnetic card, magnetic drum, etc., and more particularly to a magnetic recording medium which comprises a magnetic recording film and a surface treatment layer thereon chemically bonded firmly to the film and which has excellent sliding endurance characteristics and high reliability, a process for producing the magnetic recording medium, and a surface treatment agent for the magnetic recording medium.

Generally, the surface of a magnetic recording medium is rubbed by a magnetic recording head or the like at the times of recording and reproduction. To prevent the reduction in the performance of the magnetic recording medium due to the friction, it is necessary, for instance, to provide a lubricating layer adhered firmly to the magnetic recording film. As a lubricant to be provided on the magnetic recording film, perfluoropolyether is generally known to have relatively good performance. Particularly, a perfluoropolyether having a polar group at a terminal has been proposed as a lubricant which is capable of cleaning with isopropyl alcohol and is highly adhesive to magnetic recording media (U.S. Pat. No. 4,268,556).

Besides, a method of providing a surface treatment layer on a magnetic recording film so as to obtain a higher adhesiveness to a lubricating layer is disclosed in Japanese Patent application Laid-Open (KOKAI) No. 57-164430(1982).

Moreover, in relation to coating magnetic recording media formed by use of a magnetic coating comprising magnetic particles and a binder, there has been proposed a method of providing a surface treatment layer by use of two types of surface treatment agents, one type having a functional group for bonding to the magnetic particles and the other type having a functional group for bonding to the binder [Japanese Patent Application Laid-Open (KOKAI) No. 63-69020(1988)].

SUMMARY OF THE INVENTION

In the coating magnetic recording media formed by use of a magnetic coating containing magnetic particles, a binder and the like, the magnetic coating film has a composite structural surface comprising the magnetic particles, the binder and the like. It has been difficult, by use of conventional surface treatment agents, to provide a surface treatment layer chemically bonded firmly to both the magnetic particles and the binder of such a composite structural surface.

In view of the above, there has been proposed the use of two types of surface treatment agents, one type for bonding to the magnetic particles and the other type for bonding to the binder. However, sequential surface treatments by use of the two types of surface treatment agents involves a larger number of treating steps and hence a more complicated process. On the other hand, application of a mixture of the two types of surface treatment agents makes it difficult to form a surface treatment layer having excellent uniformity and free of irregularities in the chemical bonding to the magnetic coating film, probably because part of the magnetic particles are coated with the binder-bonding surface treatment agent whereas the binder is coated with the magnetic particle-bonding surface treatment agent.

It is accordingly an object of this invention to provide a magnetic recording medium comprising a highly uniform surface treatment layer formed by use of a surface treatment agent, of a type different from the above-mentioned, capable of bonding to both the magnetic particles and the binder, a process for producing the magnetic recording medium, and a surface treatment agent for the same.

The above object of this invention is attained by a magnetic recording medium which comprises a coating magnetic film comprising magnetic particles in a binder, and a surface treatment layer on the magnetic film, wherein a fluorocarboxylic acid salt of amine, the amine having a functional group capable of bonding to the binder of the magnetic coating film, is used as a surface treatment agent to form the surface treatment layer comprising the reaction products of the surface treatment agent, the surface treatment layer bonded to the magnetic particles by carboxyl groups formed through cleavage of the amine carboxylate linkage of the fluorocarboxylic acid salt of amine.

The fluorocarboxylic acid salt of amine according to the invention may be, for example, a compound represented by the following general formula (I) or (II):

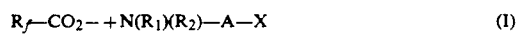
$$R_f\text{—}CO_2^-\ ^+N(R_1)(R_2)\text{—}A\text{—}X \quad (I)$$

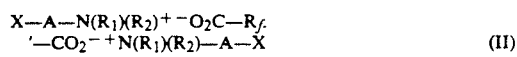
$$X\text{—}A\text{—}N(R_1)(R_2)^+\ ^-O_2C\text{—}R_f\text{—} \\ '\text{—}CO_2^-\ ^+N(R_1)(R_2)\text{—}A\text{—}X \quad (II)$$

In the general formulas (I) and (II), $R_1$ and $R_2$ each represent a hydrogen atom or an alkyl group having 1 to 4 carbon atoms, for instance, methyl, ethyl, propyl, butyl, etc.

A in the general formulas represents a divalent organic group selected from an alkylene group, an arylene group and like thereof including —$CH_2CH_2$—,

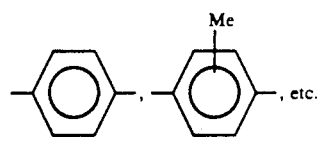

X in the general formulas is a functional group capable of bonding to the binder, specific examples thereof including —$N_3$—, —$CH=CH_2$, I, —Br, etc.

$R_f$ and $R_f'$ in the general formulas each represent a fluorocarbon group such as a perfluoroalkyl group, perfluoropolyether group, etc., specific examples thereof including

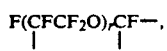
$$F(CFCF_2O)_r CF\text{—},$$
with $CF_3$ groups

$$-[(CF_2O)_p(CF_2CF_2O)_q]-$$

wherein p, q and r each represent an integer of 3 to 100, etc.

Examples of the surface treatment agent to be applied to the magnetic recording medium of this invention include the following compounds:

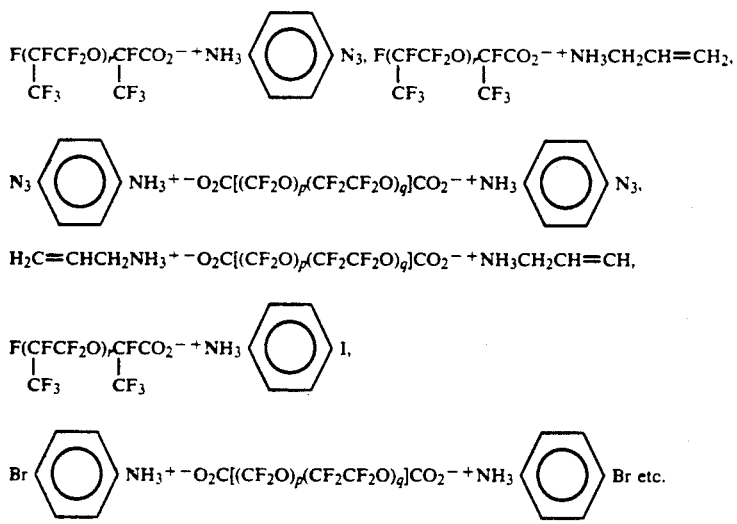

The surface treatment agent can be synthetized from an amine having the functional group capable of bonding to the binder and a fluorocarboxylic acid. Mixing and reaction of the two reactant compounds gives the fluorocarboxylic acid salt of amine as the surface treatment agent according to this invention.

As a reaction solvent for the above reaction, a mixed solvent of a fluorochemical solvent with a hydrocarbon solvent may be used. Examples of the fluorochemical solvent include fluorocarbons, fluorochlorocarbons, etc., specific exemplars including trichlorotrifluoroethane, perfluoro-2-butyl-tetrahydrofuran, perfluoroheptane, etc.

The hydrocarbon solvent may be, for instance, ether, hydrocarbon or the like, specific examples thereof including diethyl ether, diethylene glycol dimethyl ether, tetrahydrofuran, benzene, toluene, etc.

In carrying out the reaction, at least one of the above-mentioned solvents may be used either singly or in combination as a mixed solvent. Alternatively, the reactants may be dissolved separately in the fluorochemical or hydrocarbon solvents, followed by bringing the resultant solutions into reaction.

The above-mentioned amine and fluorocarboxylic acid react substantially stoichiometrically with each other. It is therefore preferable that the ratio of the amounts, in equivalents, of the two compounds served to the reaction is in the range from 0.5 to 2, from the viewpoint of removal of unreacted materials. Purification of the reaction product can be carried out by application of a known method such as extraction, distillation, liquid chromatography, etc.

The surface treatment agent of this invention synthesized in the manner as mentioned above is applied to the surface of a magnetic coating film by a dipping method, a spraying method, a spin coating method or the like, optionally followed by a heat treatment, an ultraviolet treatment or the like to react the magnetic coating film with the surface treatment agent, whereby a surface treatment layer is provided. As a result, the binder-bonding functional groups are chemically bonded to the binder, whereas the carboxyl groups formed through cleavage of the amine carboxylate linkage of the fluorocarboxylic acid salt of amine are chemically bonded to the magnetic particles. The heat treatment is preferably carried out by heating to a temperature of 50 to 200° C.

Besides, a mixture of two or more fluorocarboxylic acid salts of amine may be used as the surface treatment agent.

The magnetic recording medium prepared in the manner as described above may be used as it is. Before the use of the magnetic recording medium, an excess of the surface treatment agent not chemically bonded to the surface of the magnetic coating film may be removed by cleaning with a solvent, wiping or other similar method.

Moreover, if required, a fluorochemical lubricant may be applied to the magnetic recording medium by a dipping method, a spraying method, a rotational coating method or the like to provide a lubricating layer.

The fluorochemical lubricant may be, for instance, a polyperfluorooxyalkylene (available from Montedison under the trade name "Fomblin"), a polyhexafluoropropylene oxide (available from Du Pont under the trade name "Krytox"), a polyhexafluorooxytrimethylene (available from Daikin Industries, Ltd. under the trade name "Demunum"), or the like.

DETAILED DESCRIPTION OF THE PREFERRED EMBODIMENTS

An important point in this invention is the selection of a surface treatment agent capable of firm chemical bonding to both the magnetic particles and the binder of a magnetic coating film constituting a magnetic film of a coating magnetic recording medium.

The surface treatment agent applied to the magnetic recording medium according to the invention has a structure in which a binder-bonding functional group and a fluoro-segment are joined to each other through a $-CO_2^- \, {}^+N(R_1)(R_2)-$ linkage (wherein $R_1$ and $R_2$ each represent a hydrogen atom or an alkyl group having one to four carbon atoms). The surface treatment agent, as for example shown in FIG. 1, is chemically bonded 7 to the binder 6 by the binder-bonding functional group and is chemically bonded 8 to the magnetic particle 5 by the carboxyl group formed through cleavage of the $-CO_2^- + N(R_1)(R_2)-$ linkage.

Figure 2:
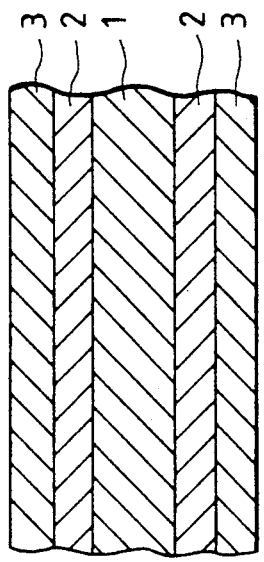
FIGS. 2 and 3 are schematic views each showing the cross-sectional structure of the magnetic recording medium mentioned in the embodiment of the invention.
Figure 3:
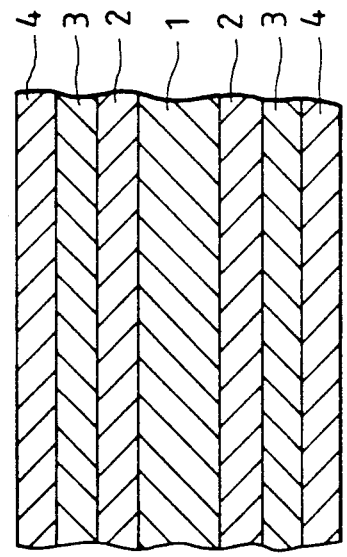
Figure 1:
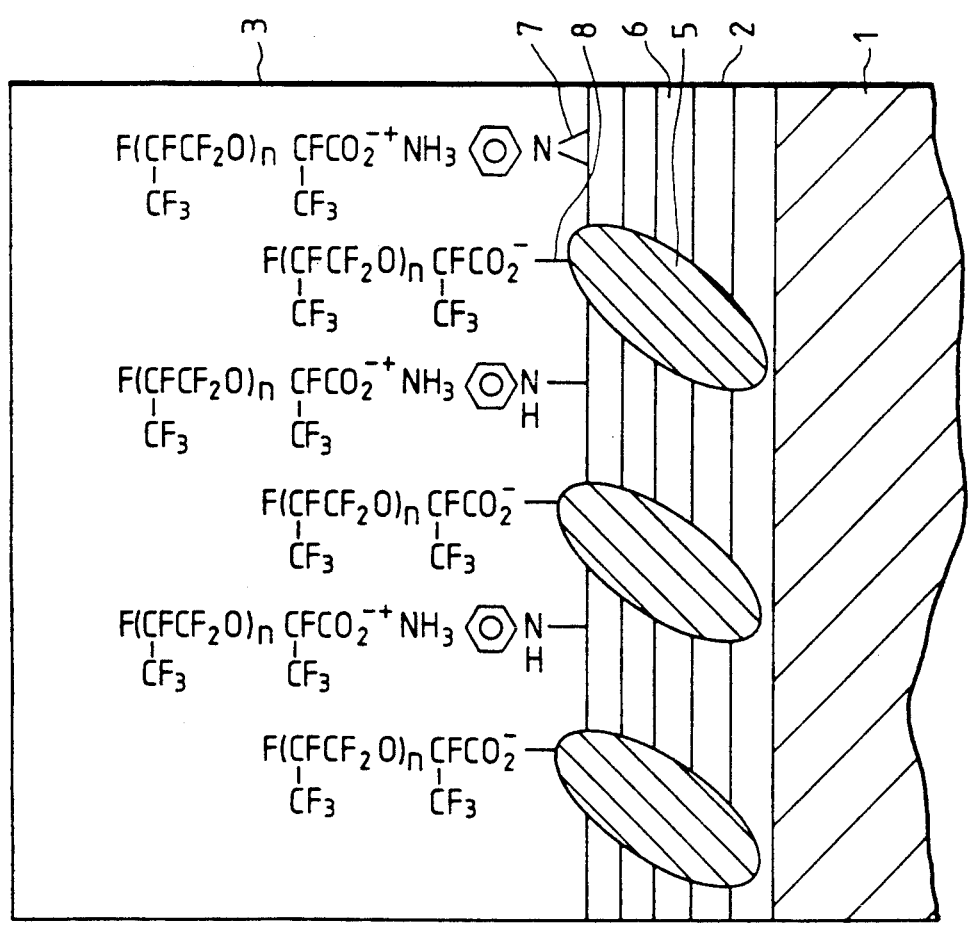
FIG. 1 is a schematic illustration of the conditions of the chemical bonding of the surface treatment layer to the magnetic coating film in the magnetic recording medium according to this invention.

Thus, it is possible to provide a dense fluorochemical surface treatment layer for the composite structural surface, such as the surface of the magnetic coating film 2 shown in FIG. 1. Even with the surface treatment layer alone, therefore, a certain extent of increase in the wear resistance of the magnetic recording medium is observed. When a fluorochemical lubricant is applied to the surface treatment layer, the surface treatment layer similar in molecular structure to the lubricant serves as an affinitive layer for the lubricant, thereby leading to a marked increase in the wear resistance.

This invention will now be explained more in detail below while referring to embodiments thereof.

First, synthetic examples of the fluorocarboxylic acid salt of amine, which is the surface treatment agent according to the invention, will be shown as Examples 1 to 3.

EXAMPLE 1

Fourty-five grams of a polyhexafluoropropylene oxide acid (available from Du Pont under the trade name "Krytox 157 FS/M"; average molecular weight, 4500) represented by the following formula:

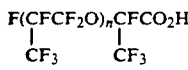

was dissolved in 100 ml of 1,1,2-trichlorotrifluoroethane (hereinafter abbreviated as "Freon").

Into the solution thus formed, 100 ml of a methanol solution containing 1.4 g of p-azidoaniline was dropped, and reaction was carried out with agitation at normal temperature.

After the reaction was over, the solvent was distilled off to obtain a compound represented by the following formula (1):

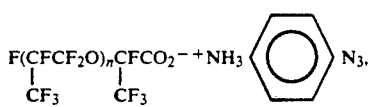

The amount of the compound obtained was 45 g (yield 98%).

The compound of the formula (1) exhibited an infrared spectrum with absorptions in the 3300–2400 cm$^{-1}$ region due to NH and CH, at 2110 cm$^{-1}$ due to $-N_3$, at 1660 cm$^{-1}$ due to $>C=O$ and at 1400–1000 cm$^{-1}$ due to CF, and an ultraviolet spectrum (in methanol) with an absorption maximum wavelength ($\lambda$ max) of 259 nm.

EXAMPLE 2

In the same procedure as in Example 1 except for using 20 g of a perfluoropolyether-$\alpha,\omega$-diacid (available from Montefluos under the trade name "Foblin Z-DIAC"; average molecular weight, 4000) represented by the following formula:

in place of the polyhexafluoropropylene oxide acid used in Example 1, a compound represented by the following formula (2) was obtained.

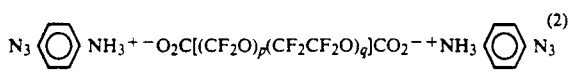

The amount of the compound obtained was 20 g (yield 95%). The compound of formula (2) exhibited an infrared spectrum with absorptions in the 3300–2400 cm$^{-1}$ region due to NH and CH, at 2110 cm$^{-1}$ due to $-N_3$, at 1660 cm$^{-1}$ due to $>C=O$ and at the 1400–1000 cm$^{-1}$ due to CF, and an ultraviolet spectrum (in methanol) with an absorption maximum wavelength ($\lambda_{max}$) of 259 nm.

EXAMPLE 3

Twenty-five grams of a polyhexafluoropropylene oxide acid (available from Du Pont under the trade name "Krytox 157 FS/L"; average molecular weight, 2500) represented by the following formula:

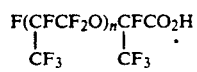

was dissolved in 50 ml of Freon.

To the solution thus obtained, 1 g of allylamine was added, and reaction was carried out with agitation.

After the reaction was over, the solvent and the unreacted allylamine were distilled off to obtain a compound represented by the following formula (3):

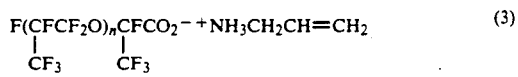

The amount of the compound obtained was 23 g (yield 92%). The compound of the formula (3) exhibited an infrared spectrum with absorptions in the 3300–2400 c$^{-1}$ region due to NH and CH and at 1680 cm$^{-1}$ due to $>C=O$, and a $^1$H—NMR spectrum with absorptions at 3.1 ppm due to the $-CH_2-$ protons, at 4.1 ppm due to the $=CH_2$ protons and at 4.4 ppm due to the $CH=C$ proton.

Next, examples of application of the surface treatment agent of this invention to magnetic recording media will be explained.

Magnetic coating films were produced by dispersing magnetic particles ($\gamma$-$Fe_2O_3$) and a reinforcement agent (particles of $\alpha$-$Al_2O_3$) by use of a binder comprising an epoxy, a phenol and a polyvinylbutyral and an appropriate amount of solvent to prepare a magnetic coating, applying the coating to an aluminum alloy substrate 14 inches in diameter, and heat-curing the applied magnetic coating, followed by a surface polishing treatment. The magnetic recording films thus obtained were used in the following Examples and Comparative Examples. The volume content of the magnetic particles was about 25%.

EXAMPLE 4

To the magnetic coating film obtained above, a Freon solution containing 0.5wt% of the surface treatment agent represented by the following formula (1) was sprayed, and the solution was rubbed against the magnetic coating film with a gauze tape while rotating the disk.

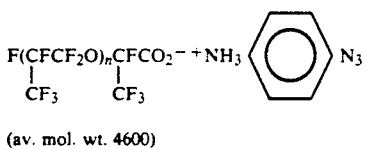

(av. mol. wt. 4600)

Then, chemical bonding of the surface treatment agent to the magnetic coating film was effected by irradiation with UV rays and the magnetic coating film was subjected to ultrasonic cleaning in Freon for about 10 minutes to remove the free surface treatment agent.

The surface of the magnetic coating film thus treated was subjected to measurement of contact angle (using n-hexadecane), the result being shown in TABLE 1.

EXAMPLE 5

A specimen was prepared in the same manner as in Example 4 except that a compound represented by the following formula (2) was used in place of the surface treatment agent used in Example 4.

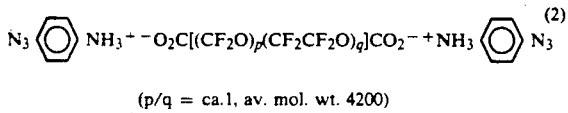

(p/q = ca.1, av. mol. wt. 4200)

EXAMPLE 6

A specimen was prepared in the same manner as in Example 4 except that a compound represented by the following formula (3) was used in place of the surface treatment agent used in Example 4.

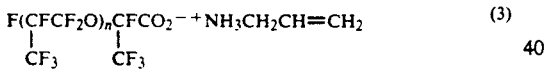

(av. mol. wt. 2500)

COMPARATIVE EXAMPLE 1

Compounds represented respectively by the following formulas (4) and (5) were used as surface treatment agents.

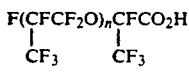

(av. mol. wt. 4500)

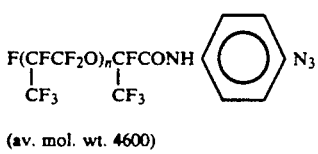

(av. mol. wt. 4600)

The surface treatment of a magnetic coating film was carried out as follows. First, the compound of the formula (4) was applied as a magnetic particle bonding surface treatment agent to the magnetic coating film in the same manner as in Example 4, followed by cleaning with trifluorotrichloroethane. Further, the surface treatment agent represented by the formula (5) was applied, and was irradiated with UV rays to effect bonding to the binder of the magentic coating film. Thereafter, the magnetic coating film thus treated was subjected to ultrasonic cleaning in trifluorotrichloroethane for 10 minutes to prepare a specimen.

COMPARATIVE EXAMPLE 2

A specimen was prepared in the same manner as in Comparative Example 1 except that the surface treatment agent of the above formula (4) in Comparative Example 1 was replaced by a compound represented by the following formula (6), and the compound of the above formula (5) was replaced by a compound represented by the following formula (7).

(p/q = ca.1, av. mol. wt. 4000)

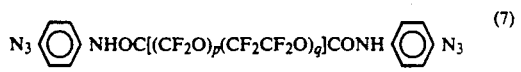

(p/q = ca.1, av. mol. wt. 4200)

COMPARATIVE EXAMPLE 3

A specimen was prepared in the same manner as in Comparative Example 1 except that the compound of the above formula (4) used as the surface treatment agent in Comparative Example 1 was replaced by a compound represented by the following formula (8), and the compound of the above formula (5) was replaced by a compound represented by the following formula (9).

(av. mol. wt. 2500)

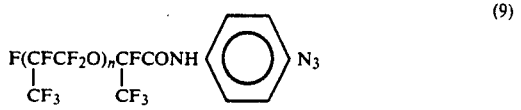

(av. mol. wt. 2600)

COMPARATIVE EXAMPLE 4

The compound of the above formula (8), which is a surface treatment agent for bonding to the magnetic particles, was applied to the magnetic coating film by the same method as in Comparative Example 1, followed by ultrasonic cleaning in Freon for 10 minutes to prepare a specimen.

COMPARATIVE EXAMPLE 5

The compound of the above formula (9), which is a surface treatment agent for bonding to the binder, was applied to the magnetic coating film by the same method as in Comparative Example 1, followed by irradiation with UV rays for 30 minutes to effect bonding of the surface treatment agent to the binder. Thereafter, the magnetic recording film thus treated was subjected to ultrasonic cleaning in Freon for 10 minutes to prepare a specimen.

The surfaces of the magnetic coating films obtained in the Examples 4 to 6 and the Comparative Examples 1 to 5 were subjected to measurement of contact angle (using n-hexadecane), the results being shown in TABLE 1.

TABLE 1

| Example No. | Comparative Example No. | Surface Treatment Agent | Contact Angle (°) (n-hexadecane) |
|---|---|---|---|
| 4 | — | (1) | 75 |
| — | 1 | (4), (5) | 75 |
| 5 | — | (2) | 74 |
| — | 2 | (6), (7) | 74 |
| 6 | — | (3) | 75 |
| — | 3 | (8), (9) | 75 |
| — | 4 | (8) | 31 |
| — | 5 | (9) | 67 |

Referring to TABLE 1, the results obtained in Example 4 and Comparative Examples 4 and 5 show that the surface treatment layer provided on the surface of the magnetic coating film according to the invention has a greater contact angle and a lower surface energy, as compared with the surface treatment layers obtained by the single use of the magnetic particle-bonding surface treatment agent [the compound of the formula (8)]or by the single use of the binder-bonding surface treatment agent [the compound of the formula (9)].

It is also seen, from the results obtained in Examples 4 to 6 and Comparative Examples 1 to 3, that the surface treatment agent according to this invention, which is capable of bonding to both the magnetic particles and the binder, makes it possible to provide, by a single surface treatment, a low-energy surface equivalent to the low-energy surface obtained by joint use of the magnetic particle-bonding surface treatment agent and the binder-bonding surface treatment agent.

Now, examples for showing the excellent wear resistance of the magnetic recording medium according to the invention will be given as follows.

Each of the coating magnetic disks prepared in the Examples 4 to 6 above were subjected to a lubricating treatment. The treatment was carried out by spraying a 0.5 wt% solution of a surface treatment agent or a lubricant in trichlorotrifluoroethane to the surface of the magnetic disk, and rubbing the applied solution against the surface of the disk a gauze tape while rotating the disk. In the case the surface treatment of the magnetic coating film, the surface treatment agent was applied in an excess amount of about 500 mg/m$^2$, optionally followed by a heat treatment or irradiation with UV rays to effect chemical bonding. Then, the magnetic coating film thus treated was subjected to ultrasonic cleaning in trichlorotrifluoroethane for about 10 minutes to remove the free surface treatment agent. In the case of application of the lubricant, the spraying time was regulated to control the coating build-up of the lubricant. The coating build-up of the surface treatment agent and of the lubricant was measured by Fourier Transform infrared spectroscopic analysis (FT-IR spectroscopic analysis).

Evaluation of wear resistance was carried out as follows. An α-alumina slider (sperical-surface slider with a radius of curvature of 30 mm) was pressed against the magnetic disk prepared by the method described above, under a load of 20 gf, the disk was rubbed repeatedly at a sliding velocity of 20 m/sec, and the number of times of rubbing required for formation of flaw in the surface of the magnetic recording medium (referred to as "sliding strength") was measured.

The surface treatment agents and lubricants used are set forth in TABLES 3 and 4.

TABLE 3

| Formula of Compound | Surface Treatment Agent | |
|---|---|---|
| (1) | 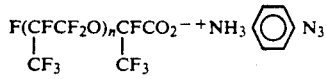 | (av. mol. wt. 4600) |
| (2) | 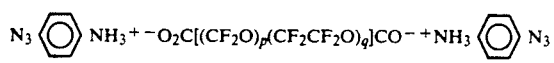 | (p/q = ca.1, av. mol. wt. 4200) |
| (3) | 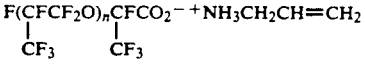 | (av. mol. wt. 2600) |
| (4) | 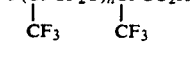 | (av. mol. wt. 4500) |
| (5) | 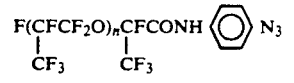 | (av. mol. wt. 4600) |
| (6) | HO$_2$C[(CF$_2$O)$_p$(CF$_2$CF$_2$O)$_q$]CO$_2$H | (p/q = ca.1, av. mol. wt. 4000) |
| (7) | 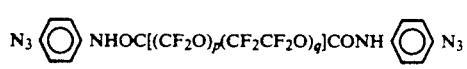 | (p/q = ca.1, av. mol. wt. 4200) |
| (8) | 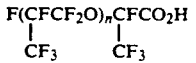 | (av. mol. wt. 2500) |

TABLE 3-continued

| Formula of Compound | Surface Treatment Agent | |
|---|---|---|
| (9) |  F(CFCF$_2$O)$_n$CFCONH—⟨⟩—N$_3$ <br> CF$_3$   CF$_3$ | (av. mol. wt. 2600) |

TABLE 4

| Formula of Compound | Lubricant |
|---|---|
| (A) | F(CFCF$_2$O)$_n$CF$_2$CF$_3$ <br> CF$_3$ <br> (av. mol. wt. 4400) |
| (B) | CF$_3$O[(CF$_2$O)$_p$(CF$_2$CF$_2$O)$_q$]CF$_3$ <br> (p/q = ca.1, av. mol. wt. 10000) |

EXAMPLE 7

The surface treatment agent represented by the formula (1) was applied to the magnetic coating film by the same method as in Example 4, and was irradiated with UV rays for 30 minutes to effect bonding to the binder of the magnetic coating film. Then, the magnetic coating film thus treated was subjected to ultrasonic cleaning in Freon for 10 minutes. The specimen thus obtained was subjected to measurement of sliding strength, the result being shown in TABLE 2.

EXAMPLE 8

By using the compound of the formula (2) as the surface treatment agent, a specimen was prepared by the same method as in Example 7

EXAMPLE 9

By using the compound of the formula (3) as the surface treatment agent, a specimen was prepared by the same method as in Example 7.

EXAMPLE 10

A specimen prepared in the same manner as in Example 7 was coated on its surface with a lubricant represented by the following formula (A) to obtain a specimen.

F(CFCF$_2$O)$_n$CF$_2$CF$_3$     (A)
CF$_3$ (av. mol. wt. 4400)

EXAMPLE 11

A specimen prepared in the same manner as in Example 8 was coated on its surface with a lubricant represented by the following formula (B) to obtain a specimen.

CF$_3$O[(CF$_2$O)$_p$(CF$_2$CF$_2$O)$_q$]CF$_3$     (B)

(p/q = ca.1, av. mol. wt. 10000)

COMPARATIVE EXAMPLE 6

Compounds represented respectively by the following formulas (4) and (5):

F(CFCF$_2$O)$_n$CFCO$_2$H     (4)
CF$_3$   CF$_3$ (av. mol. wt. 4500)

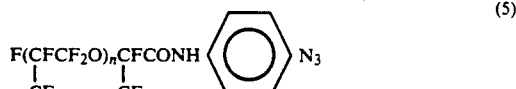

F(CFCF$_2$O)$_n$CFCONH—⟨⟩—N$_3$     (5)
CF$_3$   CF$_3$ (av. mol. wt. 4600)

were used as surface treatment agents to carry out a surface treatment of the magnetic coating film as follows. First, the compound of the formula (4), which is a magnetic particle-bonding surface treatment agent, was applied to the magnetic coating film by the same method as in Comparative Example 1, followed by cleaning with trifluorotrichloroethane. Further, the compound of the formula (5) was applied as the surface treatment agent, and is irradiated with UV rays for 30 minutes to effect bonding to the binder of the magnetic coating film. Then, the magnetic coating film thus treated was subjected to ultrasonic cleaning in trifluorotrichloroethane for 10 minutes to prepare a specimen. The specimen was subjected to measurement of sliding strength, the result being shown in TABLE 2.

COMPARATIVE EXAMPLE 7

A specimen prepared in the same manner as in Comparative Example 6 was coated on its surface with the lubricant of the formula (A) used in Example 10, to obtain a specimen.

COMPARATIVE EXAMPLE 8

The surface of the magnetic coating film not yet subjected to surface treatment was coated with the lubricant of the formula (A) in the same manner as in Comparative Example 7, to obtain a specimen.

Test results of the specimens prepared in Examples 7 to 11 and Comparative Examples 6 to 8 are collectively set forth in TABLE 2.

In the above Examples and Comparative Examples, the coating build-up of the surface treatment agent and the coating build-up of the lubricant on the specimen were measured by FT-IR spectroscopic analysis, and the measurements are shown in terms of film thickness in TABLE 2.

TABLE 2

| Example No. | Comp. Ex. No. | Surface Treatment Agent (shown in TABLE 3) | Total Coating Build-up of Surface Treatment Agent (film thickness Å) | Coating Build-up of Lubricant (film thickness Å) (shown in TABLE 4) | Sliding Strength (× $10^3$ times) |
|---|---|---|---|---|---|
| 7 | — | (1) | 55 | — | 13.5 |
| 8 | — | (2) | 50 | — | 14.2 |
| 9 | — | (3) | 48 | — | 13.0 |
| 10 | — | (1) | 44 | (A) 205 | 35.7 |
| 11 | — | (2) | 46 | (B) 190 | 38.4 |
| — | 6 | (4) (5) | 47 | — | 12.9 |
| — | 7 | (4) (5) | 45 | (A) 212 | 36.2 |
| — | 8 | — | — | (A) 254 | 11.8 |

As shown in TABLE 2, the specimens obtained through the surface treatment of the magnetic film coating by use of the surface treatment agent according to this invention (Examples 7 to 11) provide magnetic recording media having excellent sliding characteristics, in the same manner as do the magnetic recording films obtained through application of both a magnetic particle-bonding type surface treatment agent and a binder-bonding type surface treatment agent (Comparative Examples 6 and 7).

Also, the magnetic recording media obtained by providing a lubricating layer on the surface treatment layer provided by use of the surface treatment agent according to this invention (Examples 10 and 11) gave the same effect as that obtained in Comparative Example 7 in which both the magnetic particle-bonding type surface treatment agent and the binder-bonding type surface treatment agent were applied.

As has been described in detail above, according to this invention, a novel surface treatment agent capable of bonding to both the binder and the magnetic particles of a magnetic coating film is used. It is therefore possible to provide a surface treatment agent bonded firmly to an objective surface, even where the objective surface is a composite structural surface such as the surface of a magnetic coating film. Accordingly, productivity is markedly enhanced, and, moreover, it is possible to realize a magnetic recording medium having excellent wear resistance and high reliability, like the conventional magnetic recording media produced by application of two types of surface treatment agents, one for bonding to the magnetic particles and the other for bonding to the binder.

What is claimed is:

1. A magnetic recording medium which comprises a coating magnetic film comprising magnetic particles in a binder, the magnetic film provided either directly on a substrate or on an under layer provided therebetween, wherein the surface of the magnetic film is treated with a fluorocaboxylic acid salt of amine, comprising at least one selected from the group consisting of fluorocarboxylic acid salts of amine represented by the following general formula (I) or (II):

 (I)

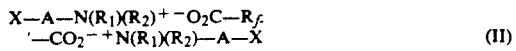 (II)

wherein $R_1$ and $R_2$ each represent a hydrogen atom or an alkyl group having one to four carbon atoms, A represents a divalent organic group selected from alkylene and arylene groups, X represents a functional group capable of bonding to a binder, selected from azido, vinyl, iodo and bromo groups, and $R_f$ and $R_f'$ each represent a fluorocarbon group selected from perfluoropolyether and perfluoroalkyl groups.

2. The magnetic recording medium as set forth in claim 1, wherein the fluorocarboxylic acid salt of the amine has a perfluoropolyether chain as a fundamental skeleton thereof.

3. The magnetic recording medium as set forth in claim 1, further comprising a lubricating layer on the surface treatment layer, the lubricating layer comprising a fluorochemical lubricant.

4. The magnetic recording medium as set forth in claim 3, wherein the fluorochemical lubricant has a perfluoropolyether chain as a fundamental skeleton thereof.

5. In a magnetic recording medium comprising a substrate, a magnetic coating film which is provided either directly on said substrate or on an under layer provided therebetween and which contains magnetic particles in a binder, and a surface treatment layer formed on said magnetic film, the improvement wherein said magnetic particles bond to a fluorocarboxylic acid in said surface treatment layer and said binder bonds to fluorocarboxylic acid salt of an amine comprising at least one selected from the group consisting of fluorocaroxylic acid salts of amine represented by the following general formula (I) or (II):

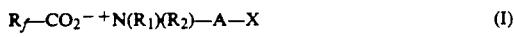 (I)

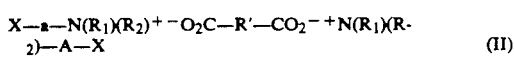 (II)

wherein $R_1$ and $R_2$ each represent a hydrogen atom or an alkyl group having one to four carbon atoms, A represents a divalent organic group selected from aklylene and arylene groups, X represents a functional group capable of bonding to a binder, selected from azido, vinyl, iodo and bromo groups, and $R_f$ and $R_f'$ each represent a fluorocarbon group selected from perfluoropolyether and perfluoroalkyl groups.

6. The magnetic recording medium as set forth in claim 5, wherein the fluorocarboxylic acid salt of an amine has a perfluoropolyether chain as a fundamental skeleton thereof.

* * * * *